United States Patent
Johnson et al.

[11] Patent Number: 5,864,390
[45] Date of Patent: Jan. 26, 1999

[54] OPTICAL SYSTEM FOR USE IN A PHOTOGRAPHIC PRINTER

[75] Inventors: Bruce K. Johnson, North Andover; Philip D. Chapnik, Newton, both of Mass.

[73] Assignee: Polaroid Corporation, Cambridge, Mass.

[21] Appl. No.: 703,985

[22] Filed: Aug. 28, 1996

[51] Int. Cl.⁶ .............................. G03B 27/54; G02F 1/13
[52] U.S. Cl. .................................. 355/67; 349/1
[58] Field of Search ........................ 349/1, 64; 355/1, 355/47, 67, 69, 71; 340/701

[56] References Cited

U.S. PATENT DOCUMENTS

| | | | |
|---|---|---|---|
| 4,192,578 | 3/1980 | Suzuki et al. | 350/320 |
| 5,079,544 | 1/1992 | DeMond et al. | 340/701 |
| 5,225,920 | 7/1993 | Kasazumi et al. | 349/1 |
| 5,539,485 | 7/1996 | White | 355/71 |
| 5,610,763 | 3/1997 | Kudo | 355/71 |
| 5,636,003 | 6/1997 | Tanitsu et al. | 355/67 |
| 5,640,214 | 6/1997 | Florence | 348/743 |
| 5,663,782 | 9/1997 | Saita etal. | 355/37 |

FOREIGN PATENT DOCUMENTS

| | | | |
|---|---|---|---|
| 62 051044 | 3/1987 | Japan | G11B 7/135 |
| 07 176499 | 7/1995 | Japan | H01L 21/26 |

*Primary Examiner*—Eddie C. Lee
*Assistant Examiner*—Hung Henry Nguyen
*Attorney, Agent, or Firm*—Joseph Stecewycz; Christopher P. Ricci

[57] ABSTRACT

An optical system is disclosed wherein an arcuate mirror is used to redirect light in a compact optical printing system in which a cylindrical lens is used to converge light over a predetermined distance so that light transmission through air is enabled.

12 Claims, 6 Drawing Sheets

OPTICAL SYSTEM FOR USE IN A PHOTOGRAPHIC PRINTER

BACKGROUND OF THE INVENTION

The present invention relates generally to optical systems for use in photographic printers, and, more particularly, the invention relates to scanning optical systems using modified Schmidt-type illumination devices for use with photographic printers having spatial light modulators to modulate colored light.

There are numerous types of photographic printers available that range in cost and quality. One of the more common photographic printers uses an area cathode-ray tube ("CRT") to image a photosensitive medium. In this printer, a CRT projects a two-dimensional image through a lens system onto the photosensitive medium. A problem with this printer is its size. The CRT itself is large. The lens system then directs the light through a focal cone that takes a large volume. Due to these factors, the printer becomes relatively large.

Another commercially available printer uses a linear CRT with red, green and blue ("RGB") phosphor stripes and a fiber optic face plate to project an image onto the photosensitive medium as the photosensitive medium moves in a direction transverse to the linear CRT. While some of the size issues are addressed by this printer, the CRT is very expensive, making the printer very costly.

A third type of optical printer uses light emitting diodes ("LED"'s) and lenses to project image-bearing light to an oscillating mirror which directs the image-bearing light in a fast scan direction. Motion of the photosensitive medium relative to mirror is used for slow scan direction. This printer is compact but the optics are expensive.

Accordingly, it is an object of this invention to provide an optical system for a photographic printer that is compact.

It is another object of this invention to provide an optical system for a photographic printer that is inexpensive.

These and other objects of the invention will be obvious and will appear hereinafter.

SUMMARY

The aforementioned and other objects are achieved by the invention which provides, in one aspect, an optical system for use in a photographic printer. The optical system is useful in a photographic printer that prints consecutive lines of pixels of an image onto a photosensitive medium. The optical system comprises an illumination system, an arcuate mirror, a lens and a spatial light modulator.

The illumination system projects a beam of colored light. The illumination system can be multiple colored light sources such as light emitting diodes ("LED"'s), or can be a white light source that projects white light through a color filter wheel, inter alia.

The beam of colored light is then projected upon the arcuate mirror which is in optical alignment such that the beam is reflected toward the photosensitive medium. The arcuate mirror is fabricated such that divergence of the beam of light is minimized after reflection. Thus, the reflective beam of light is substantially collimated as it is projected toward the photosensitive medium.

The lens, which is in optical alignment with the collimated beam of light from the arcuate mirror, causes the collimated light to converge along at least one axis of the collimated beam. Generally the lens is a cylindrical lens, thus the light converges to form a line coaxial with an axis of the cylindrical lens.

Disposed between the line of focus and the lens is the spatial light modulator. The spatial light modulator has a plurality of cells which are each electrically selectable between light blocking and light transmitting positions. Each cell images a pixel which is thus selectable between the aforementioned positions to form an image on the photosensitive medium by selectively transmitting the light. Thus, as relative movement is presented between the photosensitive medium and the spatial light modulator, consecutive lines of the image are projected onto the photosensitive medium to create an image thereon.

In further aspects, the invention provides methods in accord with the apparatus described above. The aforementioned and other aspects of the invention are evident in the drawings and in the description that follows.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION

While the present invention retains utility within a wide variety of optical devices and may be embodied in several different forms, it is advantageously employed within an optical printer. Though this is the form of the preferred embodiment, and will be described as such, this embodiment should be considered illustrative and not restrictive. An example of another device in which the invention retains utility is an optical scanning system which reads light reflected from a subject to form an electronic image of the subject in a computer.

Figure 1:
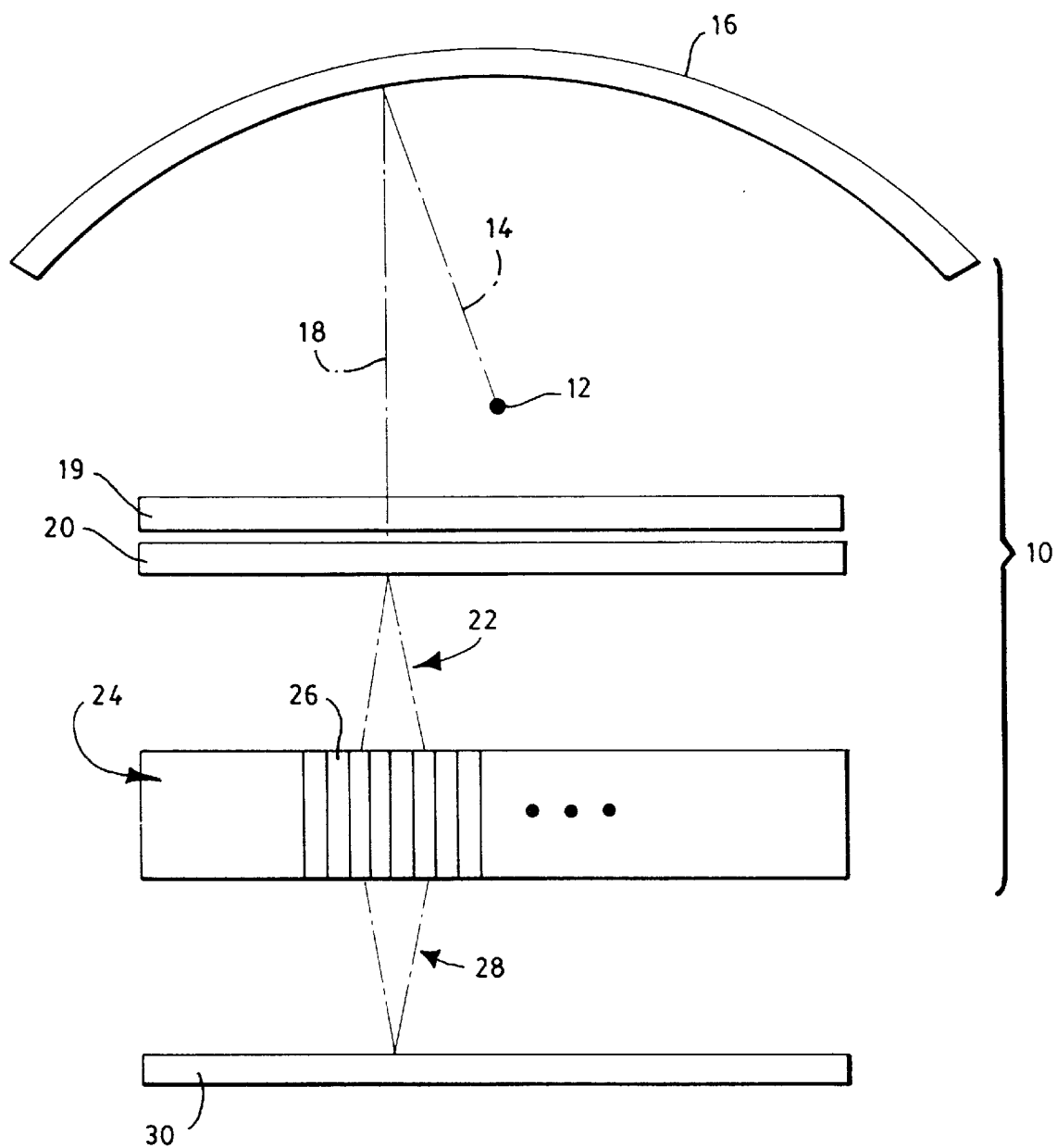
FIG. 1 is an overhead schematic view of a first embodiment of the invention.

Referring to FIG. 1, a first embodiment of the optical system 10 is shown. In this embodiment, a point source 12 projects colored light 14 towards an anamorphic mirror 16 which reflects the colored light as substantially collimated reflected light 18 to a spatial light modulator 20. The spatial light modulator 20 serves to convert collimated light 18 into image-bearing light 22. The image-bearing light 22 is transmitted via an optical conductor 24 and refocused as focused image-bearing light 28 onto a photosensitive medium 30.

The point source 12 can be any of various illumination devices. In a preferred embodiment, the illumination devices are LED's and there is at least one LED for each of red, green, and blue ("RGB"). One skilled in the art will realize that the LED's of this embodiment and those which will be discussed hereinafter can be substituted with any of various other illumination devices that create colored light, such as standard white light sources that pass through color filter wheels. The colored light 14 produced from the point source 12 is then projected onto the anamorphic mirror 16. The anamorphic mirror 16 limits the divergence of the light such that there is minimal pixel overlap. This is substantially an equivalent of collimating the light. It also allows the transfer of light through air without additional lenses. The reflected light 18 is then substantially orthogonal to the photosensitive medium 30 as it passes through a diffuser sheet 19. The diffuser sheet 19 decollimates the reflected light 18 to increase light transmission uniformity of the system.

The reflected light 18 having been diffused by the diffuser sheet 19 then passes through the spatial light modulator 20. The spatial light modulator is generally a series of cells disposed linearly across the photosensitive medium where each cell is filled with a liquid crystal. The liquid crystal is regularly arrayed in one or two dimensions giving rise to optical properties such as anisotropic scattering such that an electric field placed across an individual cell transforms the cell between light blocking and light transmissive states. In the preferred embodiment, the cells of the spatial light modulator are binary in that they are either transmissive or light blocking. Formation of gray levels on the photosensitive medium is achieved by using time delay modulation as is well known in the art. Alternatively, there can be used a spatial light modulator having multiple discrete gray levels, that is, a plurality of levels of light transmissiveness between light blocking and fully light transmissive states.

The reflected light 18 that emerges from the spatial light modulator 20 forms a divergent cone of light 22. Spatial light modulator 20 can be positioned at a greater distance from photosensitive medium by placing an optical conductor 24 into the optical path between spatial light modulator 20 and photosensitive medium 30 as shown. In this first embodiment, the optical conductor is a series of gradient index rods 26, commonly known as grinrods. Grinrods 26 are optically conductive fibers such that light which enters grinrods 26 emerges as focused image bearing light 28 which is essentially converged to a point on the photographic medium 30. One skilled in the art will understand that the light conductivity achieved using the grinrods can be obtained with other optical devices, such as a light pipe for example, though the grinrods contain desirable optical properties which are preferred.

While the optical system 10 described in FIG. 1 is useful in many applications, there still exists an area for improvement of such an implementation. The light transmission efficiency is roughly ten to twenty percent of the available light due to the optical elements used in the design. This relatively low efficiency results from the loss of reflected light 18 which is not directed into spatial light modulator 20. Using a cylindrical lens can solve this problem but the precise alignment required to position a cylindrical lens increases the manufacturing costs of the optical system.

Figure 2A:
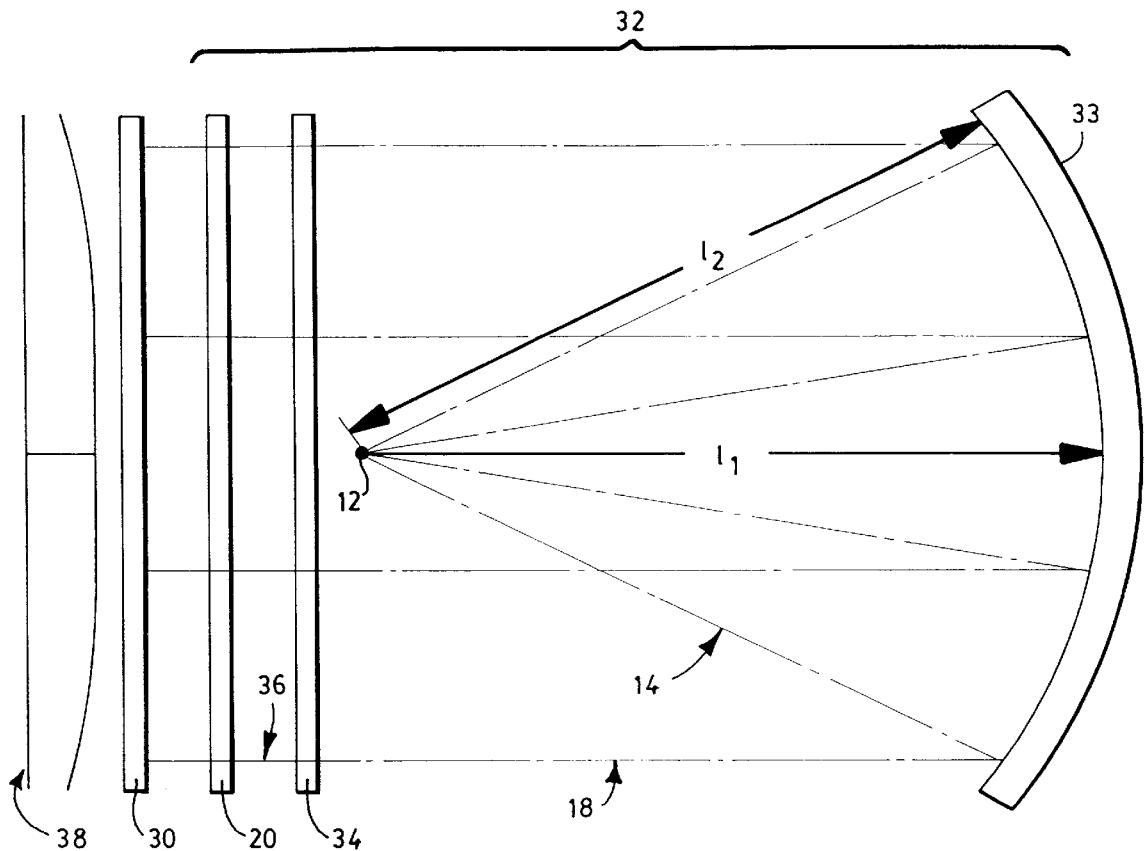
FIG. 2A is an overhead schematic view of a second embodiment of the invention.
Figure 2B:
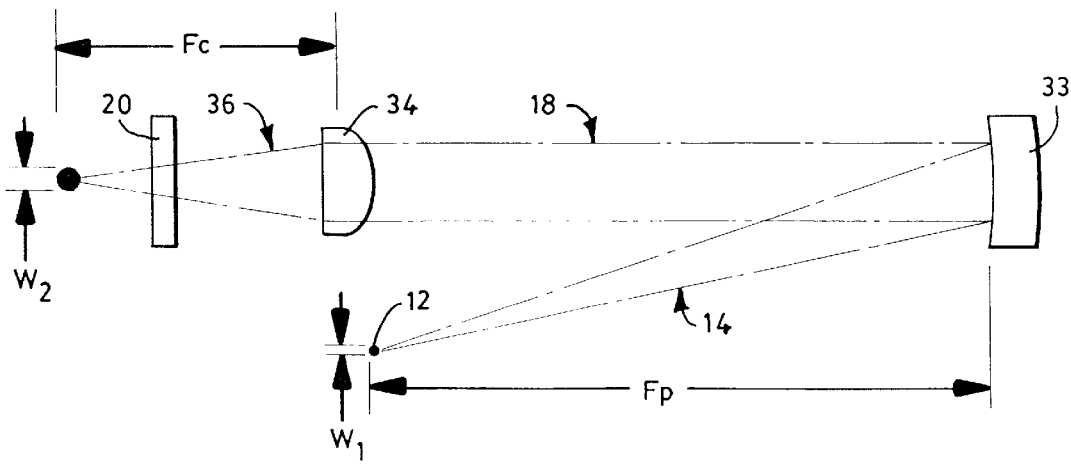
FIG. 2B is a side schematic view of the embodiment of the invention shown in FIG. 2A.

Referring now to FIGS. 2A and 2B where a second embodiment of the optical system 32 is shown, it can be seen that the path of colored light 14 has a length $l_1$ along a central axis of the optical system 32, and has a second path length $l_2$ at a furthest edge of a parabolic mirror 33. Hence the distance to the parabolic mirror 33 along the parabola varies relative to the point source 12. Therefore, since the closest point on the parabola is along the central axis and the furthest point from the parabola is along the edge of the parabolic mirror 33, the illumination drop-off of colored light 14 traveling along length $l_2$ is far greater than that colored light 14 that travels the distance $l_1$. This drop-off can be seen in the graph 38 of light intensity with respect to the photosensitive medium.

Also illustrated in this embodiment is how close proximity to the photosensitive medium can be avoided by using a cylindrical lens 34 between the parabolic mirror 33 and the spatial light modulator 20. In this way, the reflected light 18 is then made to converge along axis substantially parallel to that of the print line such that the converging light 36 passes through the spatial light modulator 20 and forms a line on the photosensitive medium 30. A width of the line is then governed by the converging focal length $F_c$ divided by the projected focal length $F_p$ ($F_c/F_p$) and, therefore, the width $W_1$ of the point source 12 is multiplied by the aforementioned magnification factor to determine the width $W_2$ of the line on the photosensitive medium 30, that is $$W_2 = W_1 F_c / F_p$$

Since $F_p$ is equal to $l_1$ at the center of the parabolic mirror 33 and is equal to $l_2$ at an edge, the formula above shows that the width $W_2$ of the line on the photosensitive medium 30 drops-off toward the edge of the photosensitive medium 30.

Figure 3:
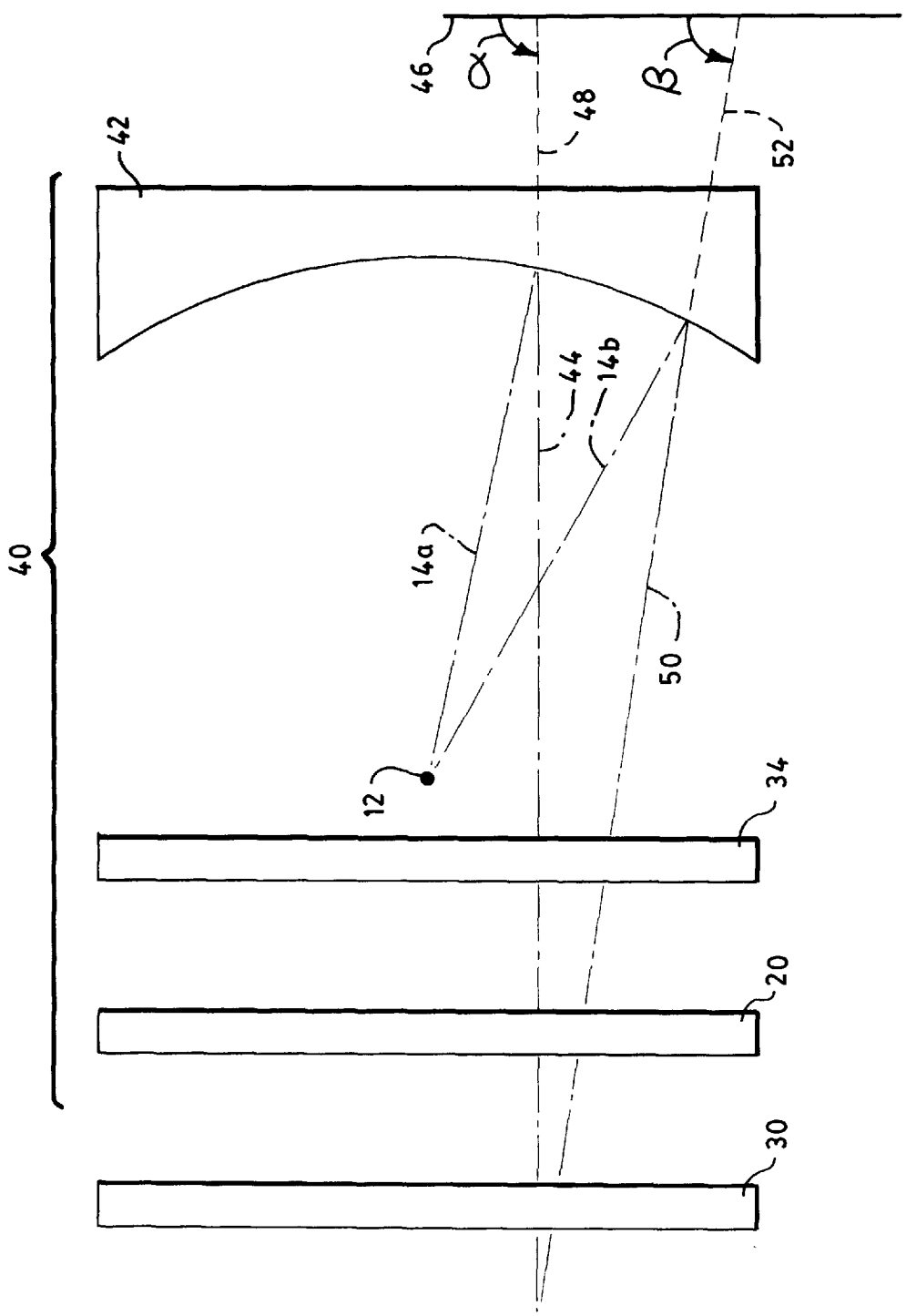
FIG. 3 is an overhead schematic view of the third embodiment of the invention.

The optical system shown in FIG. 3 solves the previous problem of light drop-off by substituting a spherical mirror 42 for the parabolic mirror previously used. In this system though, the colored light from the point source 12 has an angle change dependent upon its point of reflection. For example, a first ray 14a which reflects off of the spherical mirror as beam 44 is shown to have a reflected angle relative to the transverse axis 46 of the spherical mirror 42 where the beam 44 is shown as dotted line 48 intersects the transverse axis with an angle α, which in this example is substantially collimated. As the position of the colored light ray is moved along the spherical mirror 42, the angle with respect to the transverse axis 46 changes. Beam 14b reflects off the spherical mirror 42 as reflected beam 50, where reflected beam 50 is shown to intersect with the transverse axis 46 by a dotted line 52 at angle β which is converging. The angle with respect to the transverse axis is 90 degrees along the central axis of the optical system 40, which is substantially perpendicular to the transverse axis 46 and, therefore, reflects off of the spherical mirror 42 at an angle of ninety degrees. As the position of the colored light is displaced from the central axis, the angle of reflection with respect to the transverse axis 46 then decreases such that α is slightly less than ninety degrees. Angle β is substantially less than ninety degrees, therefore the reflected light 44 passes through the cylindrical lens 34 and the spatial light modulator 20 to impinge upon the photosensitive medium 30 at a position slightly offset from an intended position. The beam 50 follows a similar path through the lens 34 and the spatial light modulator 20, but is substantially offset from an intended position due to the angle of reflection β.

Figure 4A:
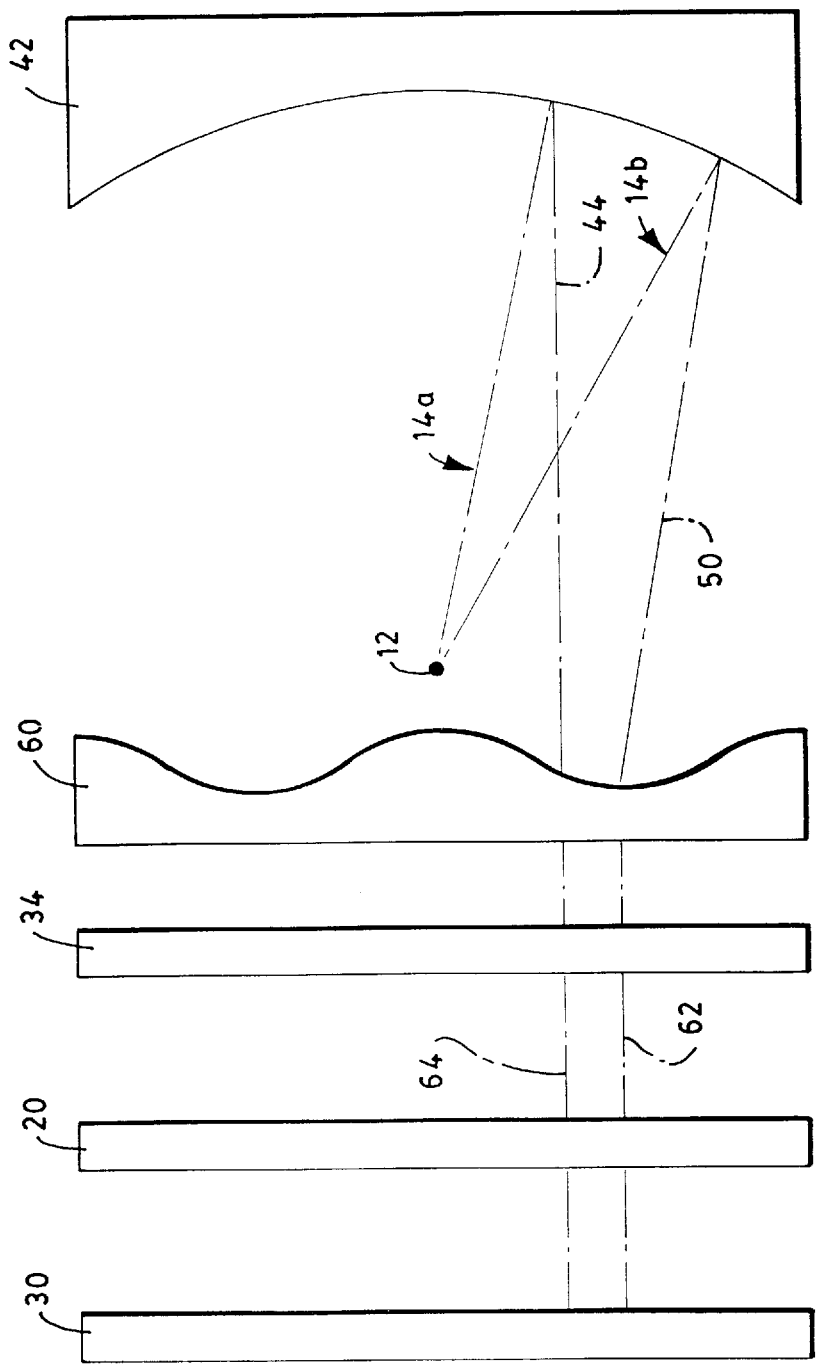
FIG. 4A is an overhead schematic view of the invention as shown in FIG. 3 including a Schmidt lens.
Figure 4B:
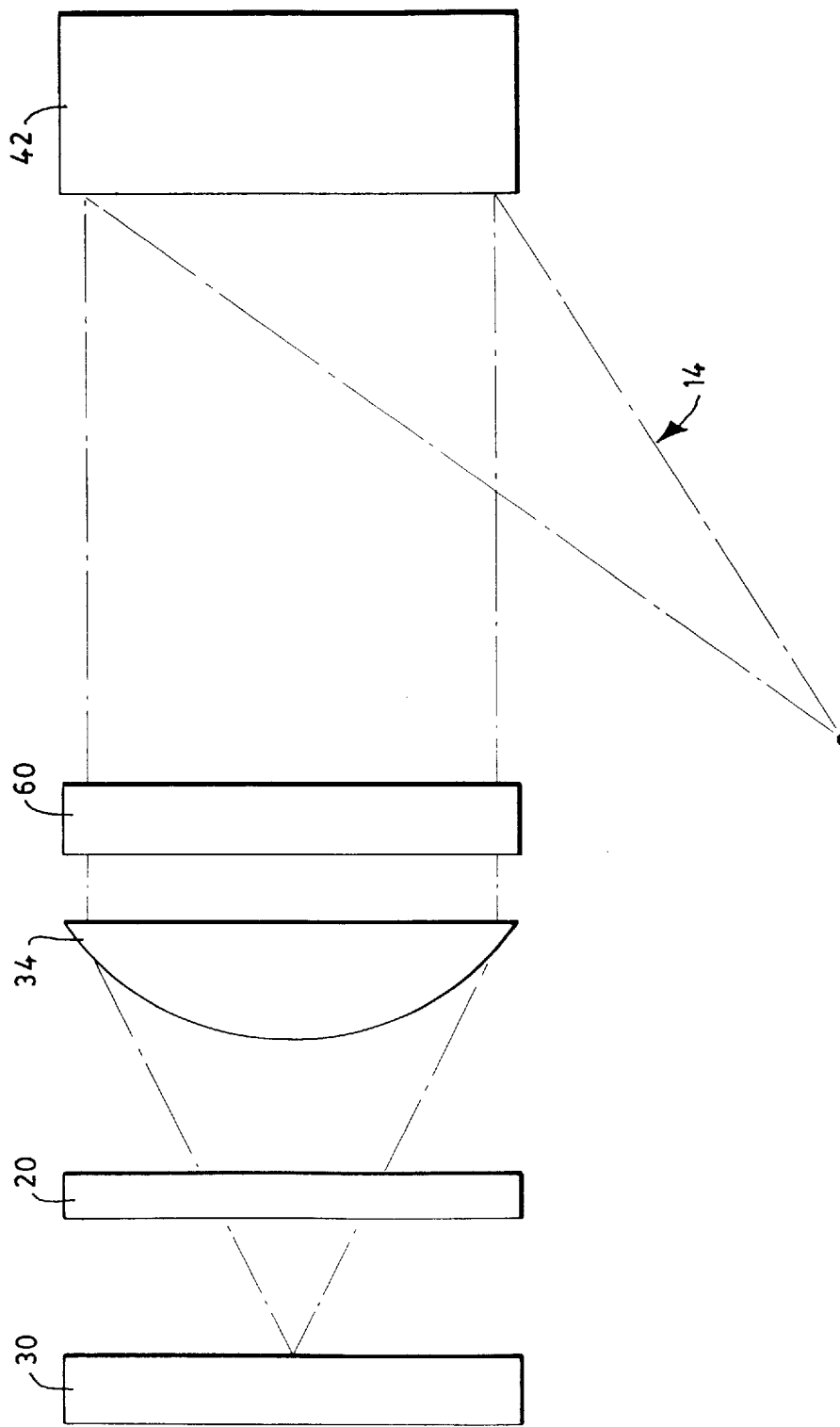
FIG. 4B is a side view of the invention as shown in FIG. 4A.

Referring now to FIGS. 4A and 4B, the point source 12 projects colored light in multiple beams as 14a and 14b which are reflected off the spherical mirror 42 as reflected beams 44 and 50, respectively. In this optical system there is a Schmidt lens 60 through which the reflected beams 44, 50 pass before being converged by the cylindrical lens 34. The Schmidt lens 60 uses a thin aspherical corrector plate placed in front of the spherical mirror 42. The corrector plate has one plane surface while the other is slightly convex around the center and slightly concave near its rim. Its purpose is to compensate for spherical aberration of the spherical mirror 42 and thereby deform the optical path of incident light rays to form an object at infinity. The compensation is most easily explained with reference to light energy. The Schmidt lens 60 is concentric about the same point as the spherical mirror 42 and has minimal off-axis aberration. The aspherical geometry of the Schmidt lens 60 is designed such that reflected light converging due to the aforementioned reflectance angle β onto a spot on the Schmidt lens 60 collects substantially the same amount of light energy as a flat lens would collect from collimated light. Additionally, the Schmidt lens 60 serves to substantially collimate the light.

The reflected beams 44, 50 then emerge from the planar surface of the Schmidt lens 60 as substantially collimated beams 64, 62 respectively. The collimated beams 62, 64 pass through the cylindrical lens 34 which converges the light through the spatial light modulator 20 onto a line on the photosensitive medium 30 as previously described with minimal resulting aberrations.

The efficiency of embodiment as compared that of the first embodiment shown in FIG. 1, is considerably greater. Due to the light focusing performed prior to light entry into the spatial light modulator 20, the efficiency is five to ten times that of the first embodiment.

Figure 5:
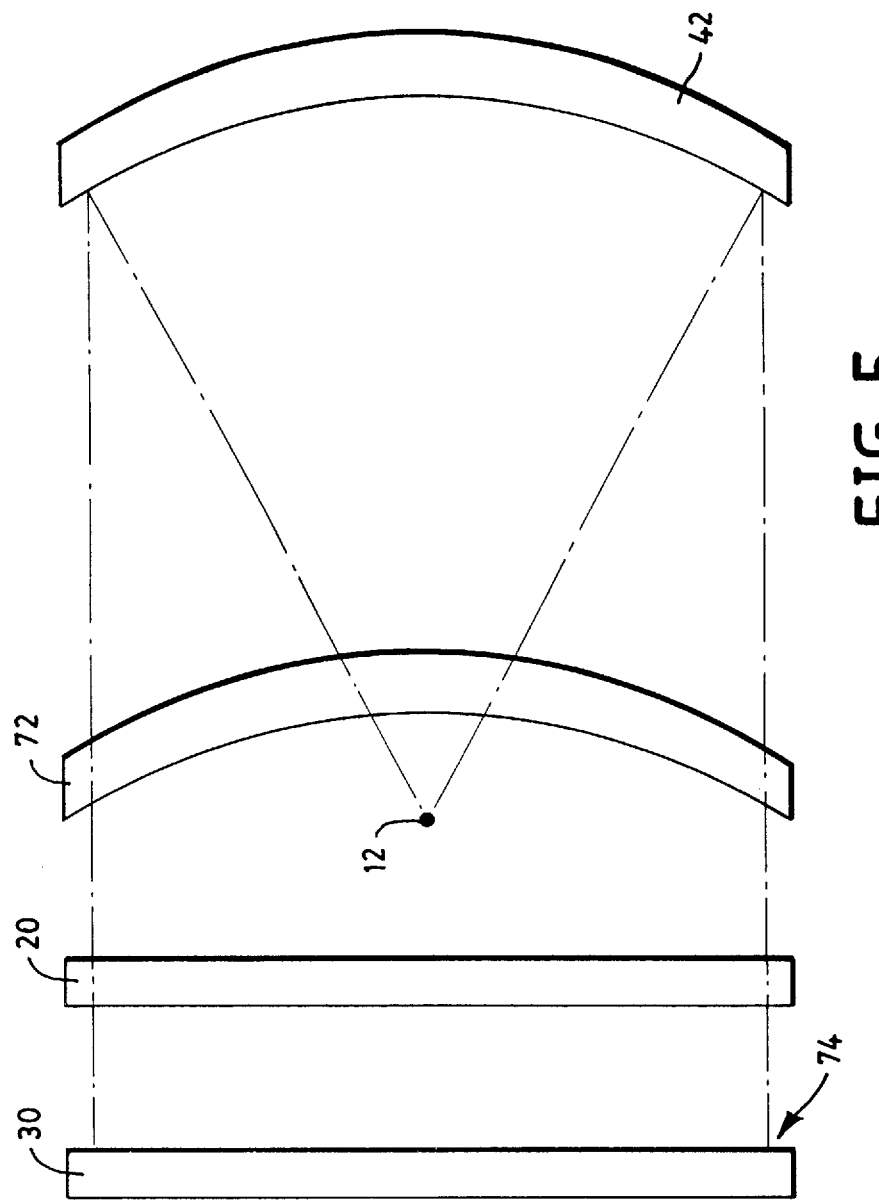
FIG. 5 is a side view of a fourth embodiment of the invention.

FIG. 5 illustrates an additional dilemma encountered when using LED's 12. In the figure, a LED 12 is shown projecting colored light off of the spherical mirror 42 as previously described. In this figure, the Schmidt lens is removed in an attempt to remove optical elements and simplify the design. In order to compensate for the spherical aberrations caused by the spherical mirror 42 that had been previously handled by the Schmidt lens, the cylindrical lens 72 is bent to form a toroidal shape such that the line 74 on the photosensitive medium 30 is focused, thereby compensating for field curvature. Bending the cylindrical lens 72 moves the focal plane in much the same manner as does the previously described Schmidt lens.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

The embodiments of the invention in which an exclusive property or privilege is claimed are defined as follows:

1. An optical system suitable for use in producing spatially consecutive patterned lines of illumination on a photosensitive medium, said optical system comprising:

illumination means for projecting a beam of light;

an arcuate mirror disposed in the optical path of said beam of light for producing a reflected substantially collimated beam of light;

a lens disposed in the optical path of said collimated beam of light for converging said collimated beam of light along at least one axis and producing a converging beam of light; and, a spatial light modulator comprising an array of selectively-transmissive cells, said spatial light modulator disposed in the optical path of said converging beam of light for selectively passing said converging beam of light to project an image-bearing beam of light onto the photosensitive medium, each said selectively-transmissive cell being electrically selectable between a light blocking state and a light transmitting state such that selective transmission of said image-bearing light produces a patterned line of illumination on the photosensitive medium.

2. The optical system according to claim 1 wherein said arcuate mirror comprises a spherical mirror.

3. The optical system according to claim 1 wherein said arcuate mirror comprises a parabolic mirror.

4. The optical system according to claim 1 wherein said lens comprises a cylindrical lens.

5. The optical system according to claim 1 wherein said cylindrical lens comprises a toroidal surface.

6. The optical system according to claim 1 wherein said lens comprises a Schmidt lens.

7. The optical system according to claim 1 wherein said lens comprises a light collecting lens.

8. The optical system according to claim 7 wherein said light collecting lens comprises a series of gradient index rods.

9. The optical system according to claim 1 wherein said illumination means comprises a light-emitting diode.

10. An optical system suitable for use in producing spatially consecutive patterned lines of illumination on a photosensitive medium, said optical system comprising illumination means for projecting a beam of light;

an arcuate mirror disposed in the optical path of said beam of light for producing a reflected substantially collimated beam of light;

diffusion means disposed in the optical path of said collimated beam of light for producing a diffused light beam; and, a spatial light modulator comprising an array of selectively-transmissive cells, said spatial light modulator disposed in the optical path of said diffused light beam for producing an image-bearing beam of light, each said selectively-transmissive cell being electrically selectable between a light blocking state and a light transmitting state such that selective transmission of said image-bearing light produces a patterned line of illumination on the photosensitive medium.

11. The optical system according to claim 10 further comprising light conductive means disposed between said spatial light modulator and the photosensitive medium.

12. The optical system according to claim 11 wherein said light conductive means comprises a series of gradient index rods.

* * * * *